United States Patent Office 3,316,290
Patented Apr. 25, 1967

3,316,290
PREPARATION OF β-ALKOXY COMPOUNDS
Donald M. Fenton, Fullerton, Calif., assignor to Union Oil Company of California, Los Angeles, Calif., a corporation of California
No Drawing. Filed Mar. 23, 1964, Ser. No. 354,131
10 Claims. (Cl. 260—484)

This invention relates to the preparation of β-alkoxy aliphatic and alicyclic acids and alkyl esters thereof from olefins, carbon monoxide and an alcohol. These β-alkoxy compounds are useful as reactants that can readily be pyrolyzed to yield unsaturated acids and alkyl esters thereof.

While it is generally known that acetylene, an alcohol, and a metal carbonyl will react to form an alkyl acrylate, heretofore no preparation for alkyl acrylates has been devised that employs relatively abundant and inexpensive olefins as the starting material. Instead, present technology employs expensive acetylene as the source hydrocarbon.

I have now found that a suitable source of unsaturated acids and esters, namely β-alkoxy acids and esters thereof, can be readily obtained from abundant olefins by reaction of the olefin with carbon monoxide and an alcohol in the presence of a mercuric ion to yield the β-alkoxy compound. These alkoxy compounds can readily be pyrolyzed by known technology to yield the desired alkyl acrylate and an alcohol, e.g., see U.S. Patent 3,114,522 and British Patents 893,727 and 921,993.

The reaction, as illustrated with ethylene as the reactant olefin, is as follows:

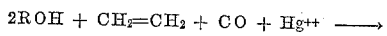

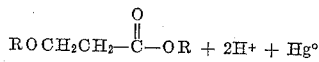

The crude reaction products comprise the alkyl β-alkoxy propionate, mercury and the acid corresponding to the anion of the mercuric salt employed. The use of higher olefins as herein set forth yields, of course β-alkoxy esters of higher molecular weight acids and/or the acids themselves in the manner set forth.

The β-alkoxy compound can be readily recovered from the crude reaction products by decanting to recover the mercury and thereafter subjected to known separatory techniques, i.e., distillation, solvent extraction, etc. to recover the desired β-alkoxy compound from the reaction solvent, acid, excess alcohol, etc. present in the crude reaction product. Thereafter, the β-alkoxy compound can be readily pyrolyzed under liquid or vapor phase conditions to provide an unsaturated acid or alkyl ester thereof.

When it is desired to prepare only the esters, the reaction should be maintained under substantially anhydrous conditions, i.e., less than about 3–5 percent water in the reaction zone. With the single exception when mercuric oxide is used as a source of mercuric ion, water is not produced in the reaction and anhydrous conditions can readily be maintained by eliminating all water from the reactants. To synthesize the β-alkoxy acids, however, water is necessary. Generally between about 5 and about 80, and preferably between about 10 and 50 percent water can be introduced into the reaction zone. Mercuric oxide can be used in this embodiment since water formed during the ensuing reaction will supply some or all of the water required.

The alcohol reactant employed in the reaction can be any desired primary alcohol corresponding to the alkoxy group and/or alkyl group desired in the β-alkoxy product. When the β-alkoxy compound is to be pyrolyzed to an unsaturated acid thereof, the alkoxy group is transient, being removed in formation of the olefinic bond. Accordingly, choice of the alkoxy group is based on ease of reaction and aliphatic primary alcohols having 1 to about 4 carbons are preferred. When an alkyl acrylate or an alkyl ester of other unsaturated acids is the desired product, the alkyl group is derived from the alcohol reactant. Hence, selection of the alcohol in this embodiment of my invention is based on the alkyl group desired in the alkyl ester, e.g., methyl, ethyl, lauryl, etc. of the alkyl acrylate to be synthesized. Generally, however, acyclic monohydroxy alcohols having from 1 to about 15 carbons can be employed to prepare the alkoxy propionate, e.g., methanol, ethanol, propanol, butanol, isobutanol, amyl alcohol, isoamyl alcohol, hexanol, isohexanol, heptanol, isoheptanol, 3-methyl hexanol-1, lauryl alcohol, 3,4-diethyl heptanol-1, etc. Preferably, low molecular weight alcohols 2 to about 10 carbons are used.

As previously mentioned, the β-alkoxy acid or alkyl ester thereof prepared according to the invention corresponds to the particular alcohol employed. The use of methanol yields methyl β-methoxy esters, ethanol yields ethyl β-ethoxy esters, butanol yields butyl β-butoxy esters. The concurrent presence of water produces yields of the corresponding acids. Mixtures of two or more alcohols yield corresponding mixed alkyl β-alkoxy esters or acids, e.g., methanol and ethanol yield methyl β-ethoxy esters and ethyl β-methoxy esters; methanol, isopropanol and water yield β-methoxy acids, β-isopropoxy acids and methyl and isopropyl esters thereof.

The particular olefin reacted determines the chain length and structure of the acid fraction of the β-alkoxy compound. To illustrate, ethylene yields β-alkoxy propionic acid and alkyl esters thereof, propylene yields β-alkoxy butyric acid and alkyl esters thereof; cyclohexene yields 2-alkoxy cyclohexanecarboxylic acid and alkyl esters thereof. Any of the following olefins having from 2 to about 10 carbons can be used: ethylene, propylene, butene-1, butene-2, isobutene, pentene-1, pentene-2, 2-methylbutene-1,2 methylbutene-2, cyclopentene, hexene-1, hexene-2, hexene-3, cyclohexene, ethylbutene, methylpentene, heptene, ethyl hexene, cycloheptene, methylcyclohexene, octene, isooctene, ethylhexene, cyclooctene, ethylcyclohexene, nonene, isononene, decene, butylcyclohexene, diethylcyclohexene, isodecene, etc. Preferably olefins having 2 to about 6 carbons are used.

The reaction can be performed in any inert organic reaction solvent, preferably in an excess of the alcohol reactant which thereby serves as the reaction solvent. When other reaction mediums are desired, however, any organic solvent that is liquid at the reaction conditions and inert to the reactants, i.e., inert to the β-alkoxy acids or their alkyl esters, carbon monoxide, mercury salts and/or alcohols, can be used. Various solvents that can be employed include various ethers such as methyl ethyl ether, diethyl ether, diisopropyl ether, dichloro ethyl ether, diisoamyl ether, ethyl benzyl ether, diethylene glycol diethyl ether, triethylene glycol dimethyl ether, triethylene glycol diethyl ether, tetraethylene glycol dimethyl ether, etc.

Various esters can also be employed as the solvent, e.g., methyl formate, ethyl formate, methyl acetate, ethyl acetate, n-propyl formate, isopropyl acetate, ethyl propionate, n-butyl formate, sec-butyl acetate, isobutyl acetate, ethyl n-butylate, n-butyl acetate, isoamyl acetate, n-amyl acetate, glycol diformate, furfurol acetate, isoamyl n-butyrate, ethyl acetal acetate, diethyl oxalate, glycol diacetate, isoamyl isovalerate, methyl benzoate, ethyl benzoate, n-propyl benzoate, n-dibutyl oxalate, etc.

The saturated hydrocarbons can of course be used as a suitable inert solvent, e.g., pentane, hexane, heptane, octane, decane, dodecane, benzene, toluene, xylene, kerosene, etc.

As previously mentioned, the reaction is conducted in the presence of a soluble mercuric ion. The soluble ion can be incorporated in the reaction medium by any suitable method. Preferably, a mercuric carboxylate salt can be added to the reaction medium and, if desired, mercuric oxide can be employed in combination therewith. The preferred source of soluble mercuric ion is the mercuric salt of carboxylic acids containing from 2 to about 25 carbon atoms, e.g., mercuric acetate, mercuric propionate, mercuric butyrate, mercuric pentonate, mercuric laurate, mercuric stearate, mercuric oleate, etc. Of these, the mercuric salts of the low molecular weight carboxylic acids, i.e., having from 1 to about 5 carbons, are preferred and mercuric acetate is most preferred.

As previously mentioned, the reaction results in the reduction of the mercuric salt to mercury and formation of the acid corresponding to the anion of the particular mercuric salt, i.e., acetic acid from mercuric acetate, etc. The mercuric ion is employed in amounts from about 0.5 weight percent to its maximum solubility, e.g., up to about 50 weight percent of the solvent. If desired the mercuric salt, in excess of its solubility, can be admixed with the reaction medium. During the reaction, this excess salt dissolves as the mercuric ion in solution, is reduced and separates as metallic mercury. In this manner a greater conversion per pass can be achieved than when using mercury in amounts not exceeding saturation.

The reaction can be conducted at temperatures from 100° to 350° C., preferably 150° to 250° C. in a single stage with pressures sufficient to maintain a liquid phase, generally from about 30 to 2000 p.s.i.g. The reaction can also be performed in two stages, the first stage temperature ranging from −50° to 50° C., preferably 0° to 30° C., and the second stage temperature ranging from 100° to 350° C., preferably 100° to 250° C., again with the aforementioned pressures.

The first stage of the preferred two stage reaction comprises reacting the olefin with the mercuric ion before introducing the carbon monoxide. Preferably the olefin-mercuric addition reaction is carried substantially to completion before introducing carbon monoxide. Failure to follow this practice results in formation of dialkyl carbonates. To the extent, however, that any amount of the olefin contacts the mercuric salt solution before carbon monoxide, yields of the β-alkoxy compound are improved. Hence, even when the reaction is performed in a single stage with no marked temperature gradient from start to completion, it is preferred to contact the mercuric salt solution with the olefin before contacting with carbon monoxide.

When the first stage is to be substantially completed before carbon monoxide introduction, the rate of the first stage reaction can be observed by following the rate of olefin absorption since one mol of olefin is absorbed per mercuric ion present. When the olefin ceases to be absorbed as indicated, for example, when the reactants achieve a constant pressure or when the rate of pressure change slows substantially, then the first stage reaction is substantially completed. The carbon monoxide can then be introduced and the reactants heated to the aforementioned second stage temperature.

Completion of the second stage reaction is also dependent on reactants and temperature. Actual completion can be observed when the reactants achieve a constant pressure indicating that carbon monoxide is no longer absorbed.

The crude reaction production containing the β-alkoxy compound can be readily decanted to separate the organic products from the mercury. The former are thereafter distilled to recover the β-alkoxy compound from the solvent employed. The solvent, i.e., excess alcohol or any of the aforementioned inert organic solvents and the by-product acid so recovered, e.g., acetic, can be combined with the mercury and the mixture subjected to known oxidizing conditions to oxidize the mercury to its soluble salt for recycling to the reaction. Various oxidants can be employed in this step, e.g., nitric acid, chromic acid, permanganates, ozone, etc., together with oxygen under temperatures from about 0° to about 250° C. to re-oxidize the mercury to the soluble mercuric salt for recycling to the reaction.

The pyrolysis of the β-alkoxy acid or alkyl ester thereof to yield the desired unsaturated acid or alkyl ester thereof can in general be conducted under conditions of temperature ranging from about 200° C. to about 450° C., preferably from about 250° to 350° C., and pressures from about $10^{-2}$ to about 200 p.s.i.g. Pyrolysis times at such temperatures are from about 0.1 to about 30 minutes, sufficient to decompose the compound to an alkyl acrylate and alcohol corresponding to the alkoxy substituent, but insufficient to further decompose the acrylate. The pyrolysis can be conducted in the liquid phase, but preferably vapor phase conditions are used to preclude polymerization of the unsaturated product. If desired, the pyrolysis can be promoted by the presence of various catalytic materials such as alkaline earth phosphates, e.g., calcium and magnesium phosphates on a suitable silicious support. If desired, aluminum salts such as aluminum chromate, aluminum phosphate, aluminum chloride, etc., can be added to enhance this activity. The resultant crude product is thereafter separated to recover, by conventional distillation, the alkyl acrylate from the alcohol and the latter can be recycled as a part of the source of the reactant alcohol in the reaction.

My invention will now be illustrated by the following examples:

Example 1

Into a 300 milliliter titanium bomb were placed 50 grams of mercuric acetate and 100 milliliters of n-butanol. The bomb was then pressured to 400 p.s.i.g. with carbon monoxide, then to 800 p.s.i.g. with ethylene. The mixture was rocked and heated to 200° C. and held at this temperature for 3 hours. After the three-hour period, the bomb was cooled, opened and the contents removed and decanted to separate about 25 grams of mercury. The decanted organic liquid was thereafter distilled to recover the excess amounts of butanol, acetic acid, water, butyl acetate and n-butyl beta-n-butoxy propionate, boiling point 56°–58°/1 millimeter, $N_D^{24}$ 1.4198. The calculated carbon and hydrogen percentages for n-butyl beta-n-butoxypropionate, $C_{11}H_{22}O_3$, are carbon 65.4 percent and hydrogen 10.9 percent and the percentages in the product were carbon 65.7 percent and hydrogen 11.2 percent.

Example 2

Into a 300 milliliter bomb was placed 40 grams of mercuric acetate and 100 milliliters of n-hexanol. The bomb was closed and pressured to 500 p.s.i.g. with ethylene, then to 1000 p.s.i.g. with carbon monoxide. The bomb was rocked and heated to 200° C. and held there for 3 hours. At the end of the three hour period the bomb pressure was 150 p.s.i.g. The bomb was then cooled, opened and its contents filtered to separate the mercury and the filtrate was distilled to remove unreacted n-hexanol, acetic acid, 1 gram of di-n-hexyl carbonate and 3 grams of n-hexyl β-n-hexoxypropionate, boiling point 99°–104° C./2 mm.

Example 3

A bomb was charged with 31 grams mercuric acetate and 100 milliliters of n-butanol. The bomb was pressured with ethylene to 500 p.s.i.g., then heated, while rocking, to 110° C. and held at that temperature for 2 hours. Thereafter, carbon monoxide was added to increase the pressure 600 p.s.i. The bomb was then heated to 200° C. and held at that temperature for 3 hours. The bomb was cooled, depressured and opened and its contents removed and distilled to recover n-butyl-β-n- butoxy propionate; B.P. 65°–70° C./3 mm., $N_D^{26}$ 1.4190. No dialkyl carbonate was produced and the yield of the β-alkoxy ester was proportionately greater than when using the single stage reaction set forth in Example 2.

*Example 4*

A bomb was charged with 31 grams mercuric acetate, 20 grams mercuric oxide and 100 milliliters methanol. Ethylene was introduced to pressure the bomb to 600 p.s.i.g. The mixture was heated, while rocking, to 80° C. and held at that temperature for 1 hour. Carbon monoxide was then introduced into the bomb to increase its pressure 600 p.s.i. The bomb was then heated to 200° C. and held at that temperature for 3 hours. Thereafter the bomb was cooled, depressured and opened, its contents removed and the organic layer distilled to recover β-methoxy propionic acid, B.P. 25°–26° C./1 mm. The distillate identity was confirmed by infrared spectroscopy.

*Example 5*

A Paar shaker bottle was charged with 31 grams mercuric acetate, 20 grams mercuric oxide and 100 grams n-butanol. Propylene was added to a pressure of 30 p.s.i.g. and the bottle was rocked at room temperature while adding propylene to maintain the pressure constant. Then the contents of the bottle (a clear solution) was transferred to a 300 milliliter bomb and carbon monoxide was added to 600 p.s.i.g. The bomb was heated, while rocking, to 200° C. and held at that temperature for 3 hours. Thereafter the bomb was cooled, opened and its contents separated into mercury and an organic fraction. The latter was distilled to recover n-butyl-beta-butoxybutanate, B.P. 68°–70° C./2 mm., $N_D^{22}$ 1.4250.

*Example 6*

A 300 milliliter bomb was charged with 40 grams mercuric acetate, 50 grams cyclohexene and 50 grams ethanol. Carbon monoxide was added to a pressure of 500 p.s.i.g. The bomb was heated to 40° C., while rocking, and held at that temperature for 2 hours, then heated to 110° C. and held there for 2 hours and finally to 200° C. and held there for 2 hours. Thereafter the bomb was cooled, opened and its contents decanted to recover the organic fraction from mercury. The organic fraction was distilled to recover a product boiling at 60°–67° C. under 2 millimeters mercury, $N_D^{22}$ 1.4222. The infrared and carbon hydrogen analysis identified the distillate as 2-ethoxycyclohexanecarboxylic acid.

The preceding examples are solely intended to illustrate my invention and demonstrate the results obtainable therewith. The examples are not intended to be unduly limiting of my invention which is intended to be defined by the method steps and their equivalents set forth in the following claims.

I claim:

1. The synthesis of a β-alkoxy compound selected from the class consisting of β-alkoxy aliphatic acids, β-alkoxy alicyclic acids and alkyl esters of said acids that comprises: contacting an olefin having 2 to about 10 carbon atoms, carbon monoxide, and a primary monohydroxy alcohol having 1 to about 15 carbons, said contacting being in the presence of mercuric ions, at a temperature between about 100° and 350° centigrade and sufficient pressure, from about 30 to 2000 p.s.i.g., to maintain a liquid phase.

2. The synthesis of claim 1 directed to the preparation of said acids wherein said contacting is effected in the presence of water.

3. The synthesis of claim 1 directed to the preparation of said esters wherein said contacting is effected under substantially anhydrous conditions.

4. The synthesis of claim 1 comprising the use of ethylene as said olefin.

5. The synthesis of claim 4 comprising the use of methanol as said alcohol.

6. The synthesis of claim 1 wherein said olefin has from 2 to about 6 carbons.

7. The synthesis of claim 1 wherein said alcohol has from 2 to about 10 carbons.

8. The synthesis of a beta-alkoxy compound selected from the class consisting of beta-alkoxy aliphatic acids, beta-alkoxy alicyclic acids and alkyl esters of said acids that comprises:

(1) contacting, in a first step, an olefin having 2 to about 10 carbons with a solution of mercuric ions in a primary monohydroxy alcohol having from 1 to about 15 carbons to react said olefin with said mercuric ion at a temperature in said first step between about −50° and 50° centigrade; and (2) thereafter contacting the reaction product of said first step with carbon monoxide at a temperature between about 100° and 350° centigrade and a pressure from 30 to about 2000 p.s.i.g., sufficient to maintain liquid phase conditions.

9. The synthesis of claim 8 wherein said olefin has from 2 to about 6 carbons.

10. The synthesis of claim 8 wherein said alcohol has from 2 to about 10 carbons.

References Cited by the Examiner

UNITED STATES PATENTS

| 2,560,277 | 7/1951 | Croxall et al. | 260—484 X |
| 3,172,914 | 3/1965 | Fujiwara et al. | 260—597 |
| 3,257,448 | 6/1966 | Clark et al. | 260—486 X |

OTHER REFERENCES

Tsuji et al.: Tetrahedron Letters, No. 22, pages 1437–1440, 1963, Pergamon Press Ltd.

LORRAINE A. WEINBERGER, *Primary Examiner.*

RICHARD K. JACKSON, *Examiner.*

ALBERT P. HALLUM, *Assistant Examiner.*